(12) United States Patent
Andersen (10) Patent No.: US 9,139,365 B2
(45) Date of Patent: Sep. 22, 2015

(54) FUNNEL DEVICE FOR ROOFTOP DRAIN COVERS

(71) Applicant: Kirk Andersen, Orlando, FL (US)

(72) Inventor: Kirk Andersen, Orlando, FL (US)

(*) Notice: Subject to any disclaimer, the term of this patent is extended or adjusted under 35 U.S.C. 154(b) by 0 days.

(21) Appl. No.: 14/444,241

(22) Filed: Jul. 28, 2014

(65) Prior Publication Data
US 2015/0151915 A1 Jun. 4, 2015

Related U.S. Application Data

(60) Provisional application No. 61/963,237, filed on Nov. 29, 2013.

(51) Int. Cl.
*B65G 11/00* (2006.01)
*B65G 11/02* (2006.01)

(52) U.S. Cl.
CPC ...................................... *B65G 11/02* (2013.01)

(58) Field of Classification Search
CPC ........ B65G 11/00; B01D 23/00; B01D 23/28; B01D 29/085
USPC ........... 193/2 R, 25 S, 28; 248/94; 210/172.1, 210/250, 249, 244, 241
See application file for complete search history.

(56) References Cited

U.S. PATENT DOCUMENTS

6,165,357 A   12/2000   Cormier

*Primary Examiner* — James R Bidwell
(74) *Attorney, Agent, or Firm* — Jason T. Daniel; Daniel Law Offices, P.A.

(57) ABSTRACT

A funnel device for engaging a protective cover of a rooftop drain includes a main body that forms an open top funnel, which tapers down in cross-sectional area from a wide upper edge to a narrow bottom section and a generally pointed end. An elongated stand protrudes from the bottom surface of the main body, a pair of lower tabs extend horizontally from the bottom section of the main body, and a pair of upper tabs extend diagonally from the upper edge of the main body.

13 Claims, 7 Drawing Sheets

FUNNEL DEVICE FOR ROOFTOP DRAIN COVERS

CROSS-REFERENCE TO RELATED APPLICATIONS

This application claims the benefit of U.S. application Ser. No. 61/963,237 filed on 29 Nov. 2013, the contents of which are incorporated herein by reference.

TECHNICAL FIELD

The present invention relates generally to commercial roof drainage systems, and more particularly to a low volume water funneling device which can function to direct water through a debris cover and into a rooftop drain.

BACKGROUND

The statements in this section merely provide background information related to the present disclosure and may not constitute prior art.

Large commercial buildings such as warehouses, factories, office buildings and shopping centers, for example, are typically constructed with flat roofs onto which HVAC units and other such devices are positioned. In order to prevent the roofs from becoming damaged by adverse weather conditions, a series of drain lines are strategically placed along the entirety of the roof surface in order to expel rainwater. Additionally, and in order to prevent the drains from becoming fouled by animals and debris such as leaves, dirt and branches, for example, the rooftop drain lines are typically covered with some form of protective cover.

Figure 1A:
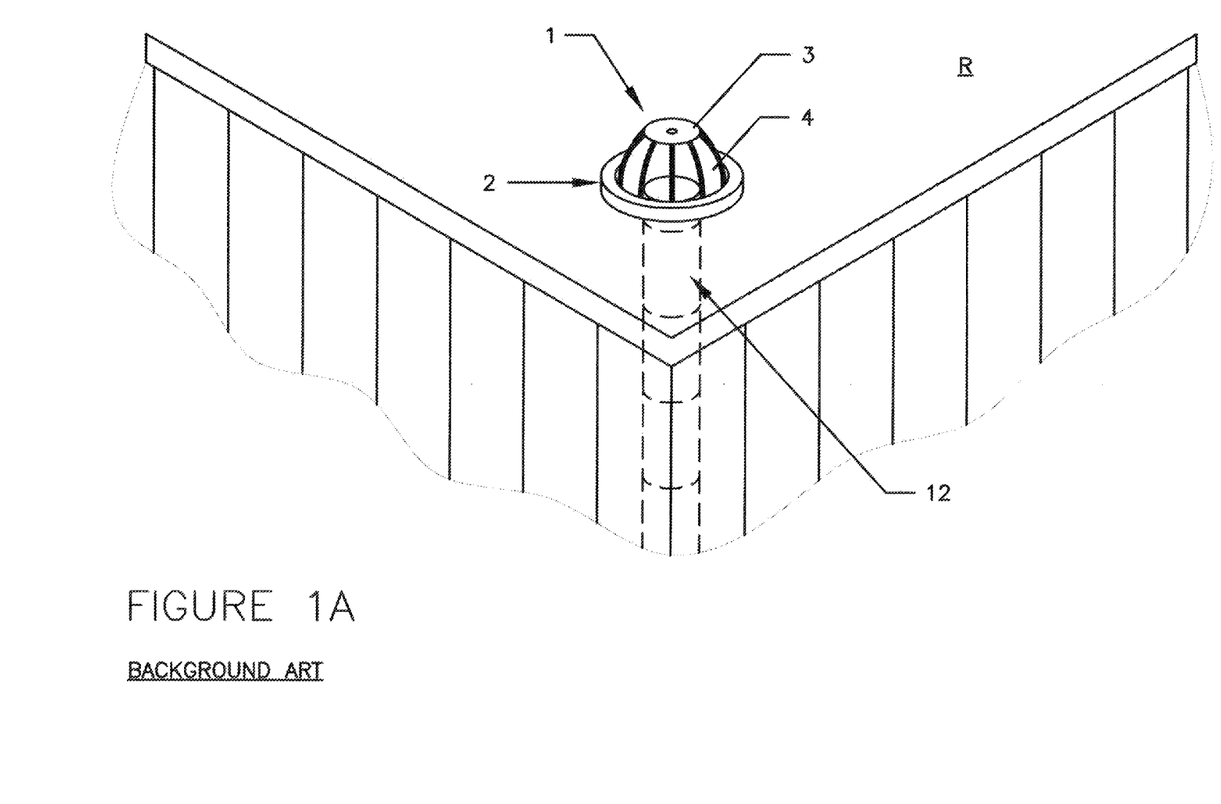
FIGS. 1A and 1B illustrate one embodiment of a rooftop drain, drain cover and HVAC system in accordance with background art.

Background FIG. 1A illustrates one example of a commonly utilized rooftop drain cover which is also described in U.S. Pat. No. 6,165,357, to Cormier, the contents of which are incorporated herein by reference. As shown, the rooftop cover 1 typically includes a generally dome shaped strainer having a raised circular bottom edge 2, a top surface 3, and a plurality of strainer elements 4 that are interposed therebetween. As shown, the drain cover 1 is positioned over drain opening 5 along the roof R, and the bottom edge 2 of the drain cover surrounds the drain opening.

When a storm causes rainwater to hit the building roof, the water is directed towards the drain cover 1 where it flows over the top of the bottom edge 2 and enters the drain 5. Owing to the raised edge 2 of the cover, a small amount of rainwater may remain on the roof after the storm, and is quickly evaporated by the sun. Although this and other such devices are useful when dealing with rainwater, there exists a problem when the devices are used in conjunction with condensation lines of HVAC systems.

Figure 1B:
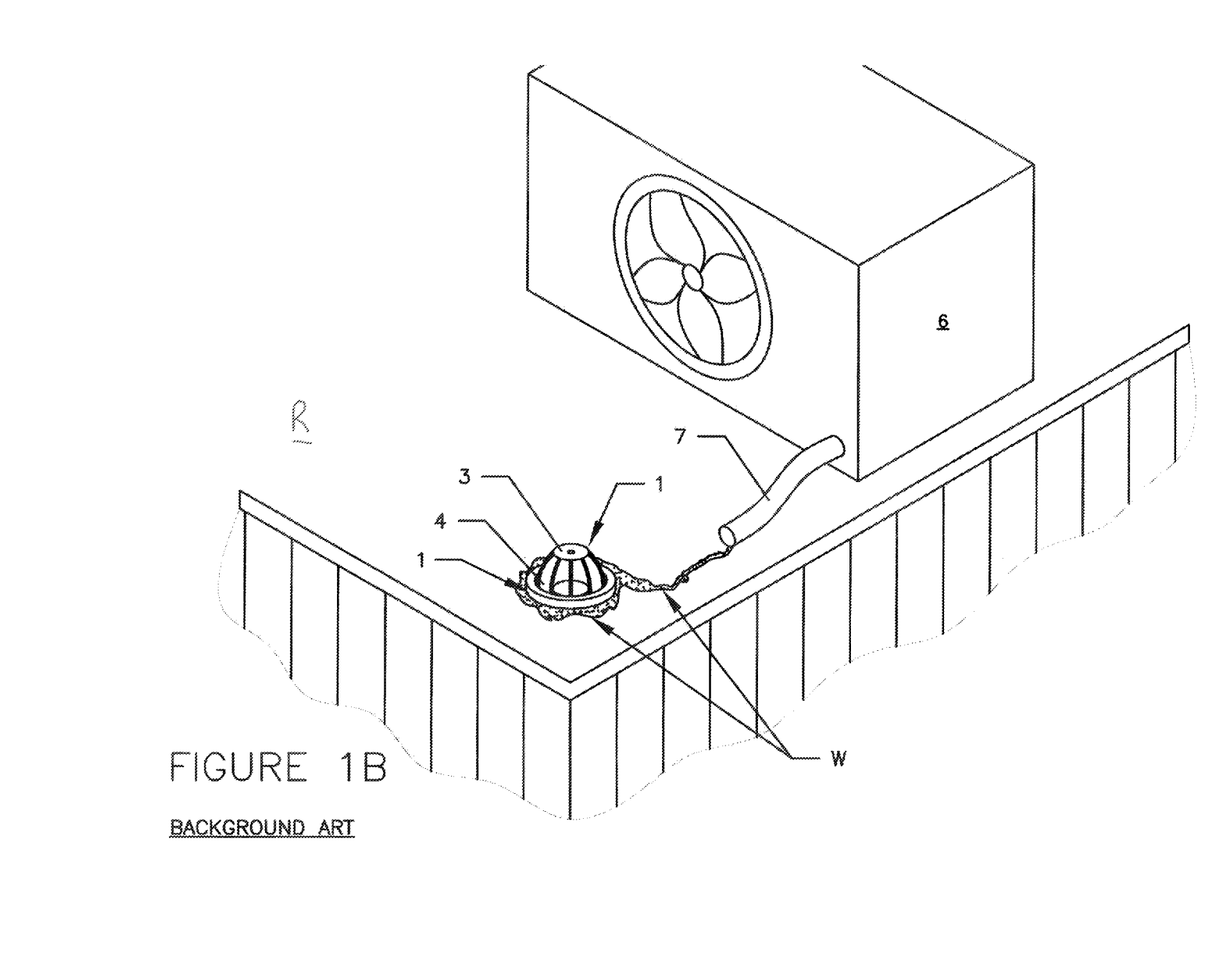

As shown in background FIG. 1B, when HVAC systems 6 are installed onto building roofs, their condensation lines 7 are routed towards the closest rooftop drain. When the HVAC systems are in operation, these condensation lines produce a constant low volume/trickle of water W which leave a condensation line, and pool along the roof surface about the bottom edge 2 of the drain cover 1. The constant presence of the corrosive low volume water prevents evaporation by the sun, and that water which cannot overcome the bottom edge 2 of the drain cover remains in place for extended periods of time.

As a result of the above, many commercial roofs suffer failure of roofing components owing to water damage, rot and the like at locations surrounding the drain lines. These failures cost building owners large amounts of money in repairs, equipment and supplies, and shorten the overall lifespan of the roof in general.

Accordingly, there remains a need for a low volume water funneling device which can be secured onto traditional rooftop drain covers, in order to direct water emanating from HVAC discharge lines directly into a building drain, while eliminating the above noted issues.

SUMMARY OF THE INVENTION

The present invention is directed to a funnel device for engaging a protective cover of a rooftop drain. One embodiment of the present invention can include a main body that forms an open top funnel, which tapers down in cross-sectional area from a wide upper edge to a narrow bottom section and a generally pointed end. The present invention can also include an elongated stand that protrudes from the bottom surface of the main body, a pair of lower tabs which can function to engage the strainers of a drain cover, and a pair of upper tabs which can function to engage a discharge line.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 2.

Although described throughout this document as being anticipated for use with a building HVAC system, this is but one possible implementation of the inventive concepts disclosed herein. In this regard, the device can be utilized to direct water emanating from any device into a building drain, in order to alleviate the above noted issues.

Figure 2:
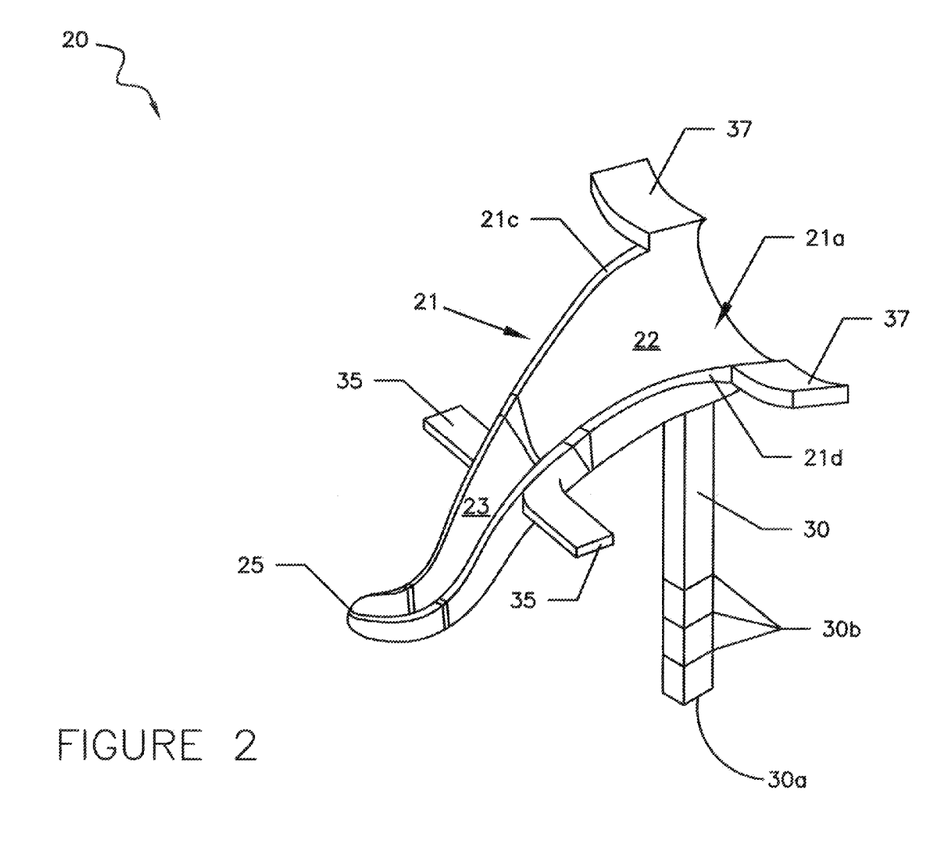
FIG. 2 is a perspective view of the funnel device for rooftop drain covers, in accordance with one embodiment of the invention.
Figure 3:
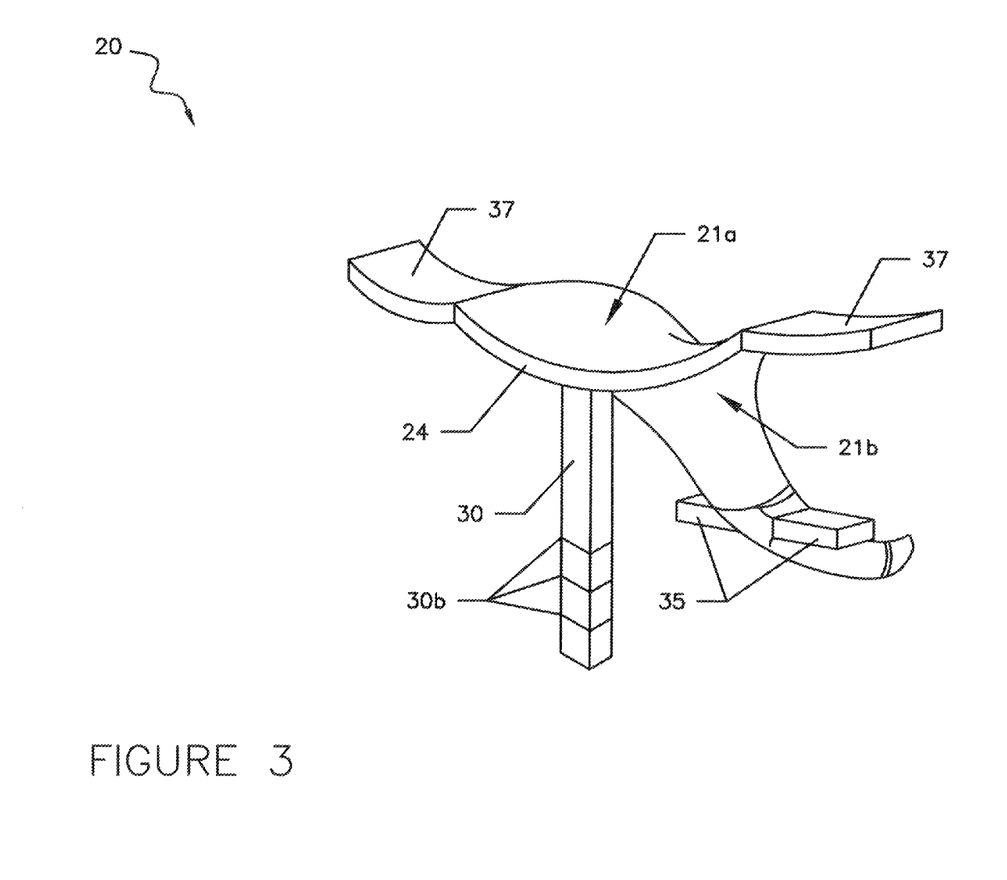
FIG. 3 is another perspective view of the funnel device for rooftop drain covers, in accordance with one embodiment of the invention.
Figure 4:
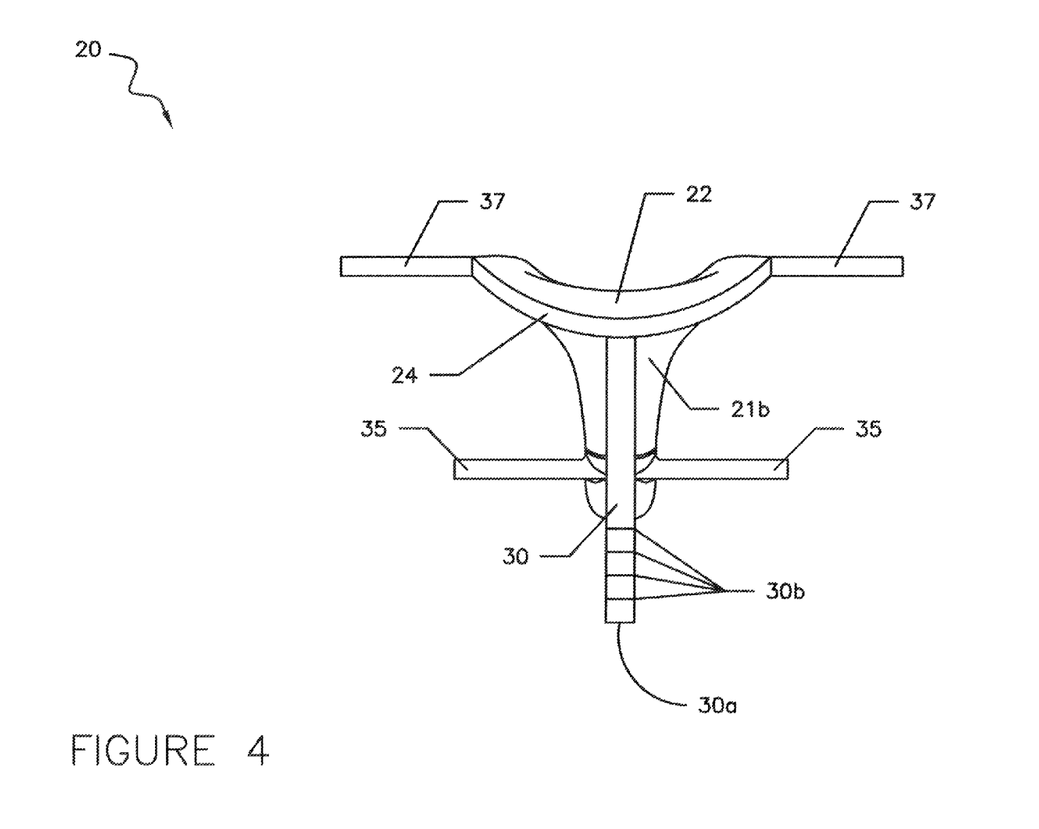
FIG. 4 is a back side view of the funnel device for rooftop drain covers, in accordance with one embodiment of the invention.

FIGS. 2-4 illustrate one embodiment of a low volume water funneling device 20, that is useful for understanding the inventive concepts disclosed herein. As shown, the device 20 can include a main body 21, having an elongated stand 30, a pair of lower tabs 35 and a pair of upper tabs 37.

The main body 21 can preferably include a unitary construction having a top surface 21a, a bottom surface 21b and a pair of opposing side surfaces 21c and 21d. As shown, the main body can preferably include a generally half-conical shaped upper section 22 (similar to one-half of a conventional conical funnel), that tapers from large to small in the downward direction, and an elongated narrow bottom section 23 that extends outward from the bottom edge of the upper section 22. In this regard, the main body 21 can form an open top funnel, which tapers down in cross-sectional area from a wide upper edge 24 until terminating into a generally pointed end 25.

As will be described below, the main body 21 is configured to provide a large upper area for receiving a steady flow of liquid, such as that discharged from a building HVAC condensation line, for example, and the gradually-reducing area of the main body concentrates the flow of liquid towards the narrowing bottom end wherein the liquid can be discharged into a building drain.

As described herein, the main body 21 can be constructed from any number of materials which are suitable for prolonged exposure to water and the elements. Several non-limiting examples include plastics, PVC, and metals such as aluminum or stainless steel, for example. In the preferred embodiment, the main body can be constructed from a single mold of injected plastic. Although described above as including a plurality of different sections, each having a particular shape, those of skill in the art will recognize that the main body may alternately be formed in a shape other than conical.

An elongated stand 30 is secured to the bottom surface 21b of the main body at a generally orthogonal angle, so as to extend downward. In one embodiment, the stand 30 can include a unitary construction with the main body, and can be shaped to include a generally rectangular element having a bottom edge 30a that functions to engage a building roof surface. Such a feature can allow the device 20 to stand upright, in order to direct water from the upper edge 24 do the lower edge 25.

In one preferred embodiment, the elongated stand can include a plurality of scored lines 30b, in order to allow a user to adjust the length of the stand by cutting the same along one or more of the scored lines. Such a feature can be useful for adjusting the height and/or angle of the main body, so as to better interface with a discharge line (e.g., a condensation line of an HVAC unit). Of course, any number of other shapes, construction materials and means for adjusting the length of the stand 30 are also contemplated.

A pair of lower tabs 35 can extend perpendicularly outward from the narrow bottom section 23 of the main body. Each of the lower tabs 35 can preferably have a generally orthogonal relationship with the elongated stand 30, and can be connected to the bottom surface 21b and/or side surfaces 21c and 21d, respectively. As will be described below, the lower tabs 35 can work in conjunction with the narrow bottom section 23 and include shapes and dimensions suitable for being inserted through the strainer elements of a building drain cover and to remain positioned inside the drain cover to prevent the device from being separated therefrom.

A pair of upper tabs 37 can extend diagonally outward from the top section 22 of the main body. Each of the upper tabs can function as a guide for receiving and directing water flow from an HVAC condensation line onto the top surface of the main body.

While the dimensions of the elements are not critical, in the preferred embodiment the main body 21 can include an upper width (measured from sides 21c to 21d along the upper edge 24) of approximately 2.5 inches, a lower width (measured from sides 21c to 21d along the entirety of bottom section 23) of approximately 0.5 inches, and a length (measured from top edge 24 to bottom edge 25) of approximately 3 inches. The stand 30 can include a height (measured from the bottom edge 30a to the bottom surface of the main body 21b) of approximately 2 inches. Each of the lower tabs 35 can include a length (distance outward from the sides 21c or 21d, respectively) of approximately 0.75 inches each, and each of the upper tabs 37 can include a length (distance outward from the sides 21c or 21d, respectively) of approximately 1 inch each.

Figure 5:
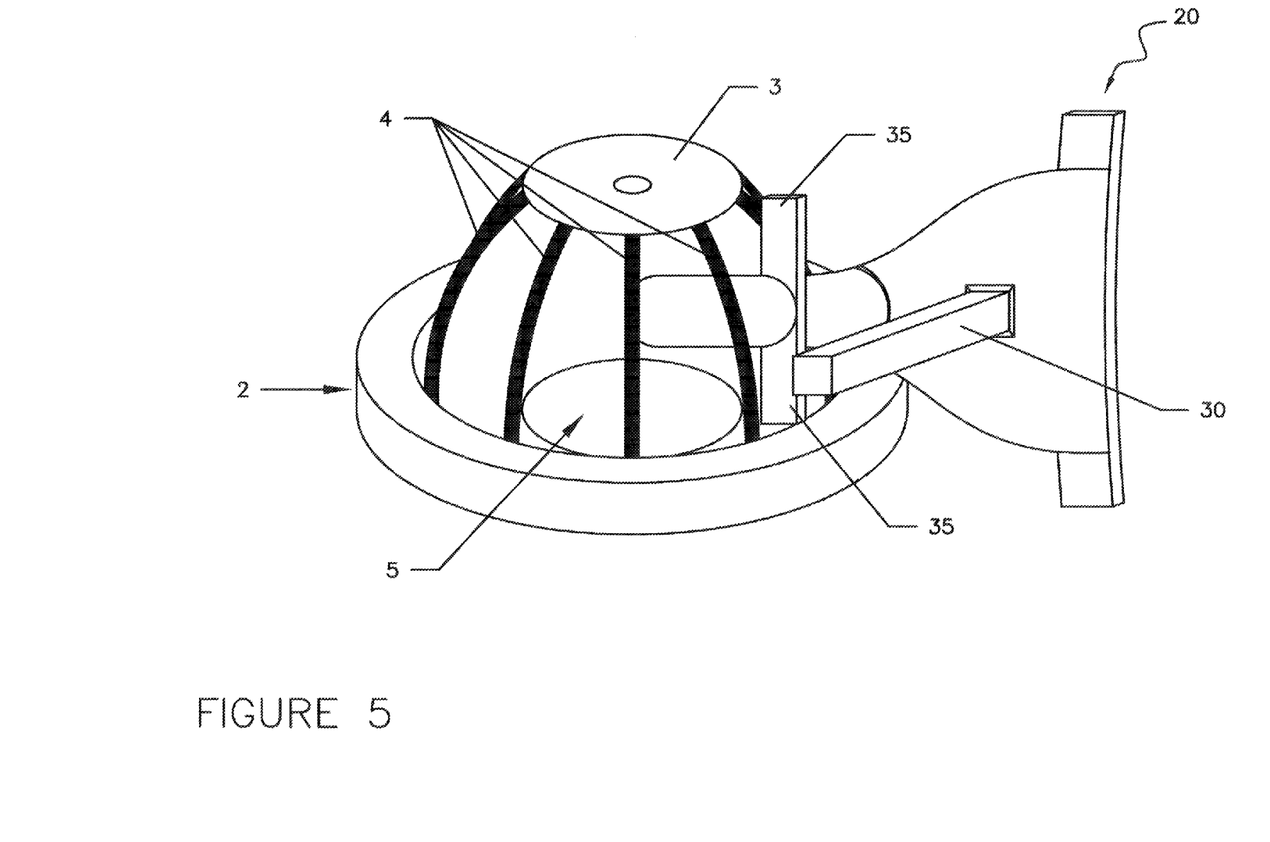
FIG. 5 is a side profile view of the funnel device for rooftop drain covers in operation, in accordance with one embodiment of the invention.
Figure 6:
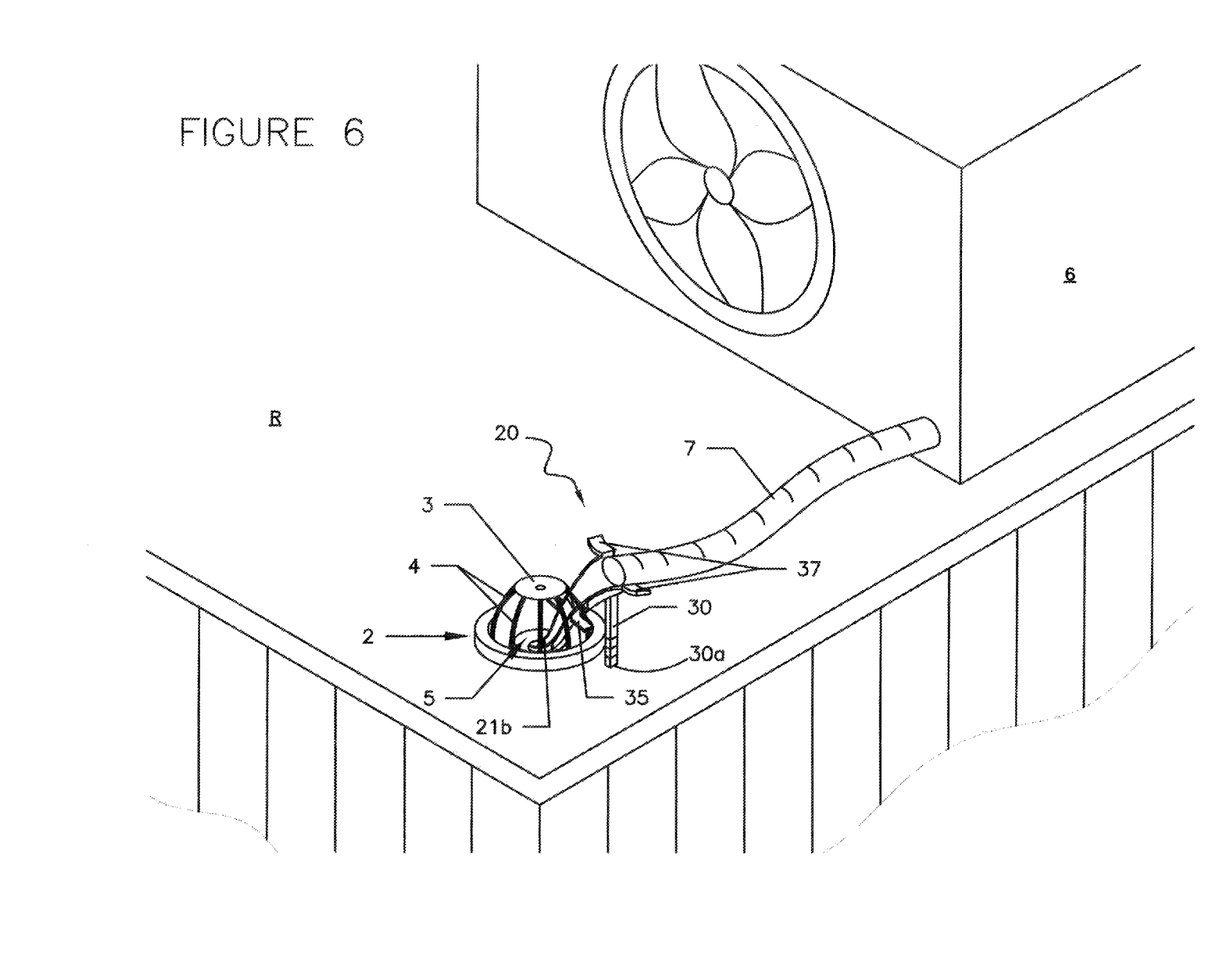
FIG. 6 is another side profile view of the funnel device for rooftop drain covers in operation, in accordance with one embodiment of the invention.

FIGS. 5 and 6 illustrates one embodiment of the device 20 in operation. As shown best in FIG. 5, the device can be rotated onto its side, and the lower section 23 and the lower tabs 35 can be inserted between two of the strainer elements 4 of the drain cover 1. Once inserted therein, the device can be rotated upright, and positioned so that the bottom of the elongated stand 30a, and the bottom surface 21b of the lower section 23 are in contact with the roof surface, and the lower edge 25 is positioned above the building drain 5. At this time, the width of the lower tabs 35 in a horizontal orientation will exceed the distance between the strainer elements 4, thereby preventing the device 20 from disengaging from the protective cover 1.

As shown in FIG. 6, when in this position, the condensation line 7 of the HVAC system 6 can engage the wide upper section 22 of the device, and as water flows from the condensation line, the funnel shape of the main body can direct the same through the protective drain cover 1 and into the building drain.

As described herein, one or more elements of the low volume water funneling device 20 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the main body 21, the elongated stand 30, the lower tabs 35 and the upper tabs 37, for example, may be formed together as one continuous element, either through manufacturing processes, such as welding, casting, or molding, or through the use of a singular piece of material milled or machined with the aforementioned components forming identifiable sections thereof. Accordingly, in one preferred embodiment, each of these elements can be formed from a unitary piece of injection molded plastic. Of course, other construction materials and methodologies are also contemplated.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A funnel device for engaging a protective cover of a rooftop drain, said funnel device comprising:
    a main body that includes a generally half-conical shaped upper section that terminates into an elongated narrow bottom section, said upper section having a wide upper edge, and said lower section including a generally pointed end;
    an elongated stand extending outward from a bottom surface of the main body at a location adjacent to the wide upper edge; and
    a pair of lower tabs extending outward from a first and second side of the narrow bottom section of the main body,
    said elongated stand having a generally orthogonal relationship with each of said pair of lower tabs.

2. The device of claim 1, wherein the elongated stand includes a generally rectangular construction and further includes a bottom edge that is configured to engage a rooftop so as to position the device in an upright orientation.

3. The device of claim 1, wherein the main body, the elongated stand and the pair of lower tabs include a unitary construction.

4. The device of claim 1, further comprising:
    a pair of upper tabs extending outward from a first and second side of the wide upper edge of the main body, said upper tabs being disposed along a generally diagonal angle and in a generally opposite direction than the elongated stand.

5. The device of claim 1, wherein the wide upper edge of the upper section includes a dimension suitable for engaging an HVAC condensation line, and the elongated narrow bottom section includes a dimension suitable for being positioned between a pair of strainer elements of a rooftop drain cover.

6. The device of claim 1, wherein the upper section of the main body includes a width of approximately 2.5 inches.

7. The device of claim 1, wherein the elongated bottom section of the main body includes a width of approximately 0.5 inches.

8. The device of claim 1, wherein the main body includes a length of approximately 3 inches.

9. The device of claim 1, wherein the elongated stand includes a height of approximately 2 inches.

10. The device of claim 1, wherein each of the lower tabs include a length of approximately 0.75 inches.

11. The device of claim 1, wherein each of the upper tabs include a length of approximately 1 inch.

12. The device of claim 1, further comprising:
    one or more generally horizontal scored lines that are arranged along the elongated stand, said scored lines functioning to allow a user to adjust a length of the elongated stand.

13. A method for directing low volumes of water from a discharge line through a drain cover and into a rooftop building drain, said method comprising:
    providing a funnel device that includes
        a main body that includes an upper surface, a bottom surface, a generally half-conical shaped upper section that terminates into an elongated narrow bottom section, said upper section having a wide upper edge, and said lower section including a generally pointed end,
        an elongated stand extending outward from a bottom surface of the main body at a location adjacent to the wide upper edge, said elongated stand including a bottom surface, and
        pair of lower tabs extending outward from a first and second side of the narrow bottom section of the main body,
        said elongated stand having a generally orthogonal relationship with each of said pair of lower tabs;
    rotating the funnel device to an angle of approximately 90 degrees along a central axis;
    inserting the elongated narrow bottom section and the pair of lower tabs between a pair of strainer elements of the drain cover;
    rotating the funnel device to an upright orientation wherein each of the bottom surface of the main body and the bottom surface of the elongated stand are in communication with the rooftop surface; and
    positioning the drain line along the upper section of the main body.

* * * * *